(12) United States Patent
Talamantez et al.

(10) Patent No.: US 10,703,003 B2
(45) Date of Patent: Jul. 7, 2020

(54) METHOD AND APPARATUS FOR SPIRAL HAM SLICING

(71) Applicant: SMITHFIELD FOODS, INC., Smithfield, VA (US)

(72) Inventors: Miguel Talamantez, Greenup, KY (US); Jeffery Davis, Grayson, KY (US)

(73) Assignee: Smithfield Foods, Inc., Smithfield, VA (US)

( * ) Notice: Subject to any disclaimer, the term of this patent is extended or adjusted under 35 U.S.C. 154(b) by 627 days.

(21) Appl. No.: 15/112,606

(22) PCT Filed: Jan. 23, 2015

(86) PCT No.: PCT/US2015/012619
§ 371 (c)(1),
(2) Date: Jul. 19, 2016

(87) PCT Pub. No.: WO2015/112820
PCT Pub. Date: Jul. 30, 2015

(65) Prior Publication Data
US 2016/0332316 A1    Nov. 17, 2016

Related U.S. Application Data

(60) Provisional application No. 61/931,322, filed on Jan. 24, 2014.

(51) Int. Cl.
*B26D 3/11*    (2006.01)
*A22C 17/00*    (2006.01)
(Continued)

(52) U.S. Cl.
CPC .............. *B26D 3/11* (2013.01); *A22C 17/004* (2013.01); *A22C 17/0033* (2013.01);
(Continued)

(58) Field of Classification Search
CPC ... B26D 1/01; B26D 1/04; B26D 3/11; B26D 5/06; B26D 7/01; B26D 7/02;
(Continued)

(56) References Cited

U.S. PATENT DOCUMENTS 633,932 A    9/1899  Williamson
1,458,998 A    6/1923  Sletto
(Continued)

FOREIGN PATENT DOCUMENTS

EP    2 018 809 A1    1/2009

OTHER PUBLICATIONS

International Preliminary Report on Patentability for International Patent Application No. PCT/US2015/012619, dated Jul. 26, 2016.

*Primary Examiner* — Bryan Kim
(74) *Attorney, Agent, or Firm* — McCarter & English LLP; Vadim E. Cherkasov (57) ABSTRACT

The present invention is drawn to apparatuses and methods for producing improved spirally cut meat products, such as spirally cut hams. The apparatus includes a shaft having a pad disposed at one end, said shaft slidably arranged includes a hollow tube mounted to a bracket. The apparatus includes a lever that rotates about a pivot mounted to the bracket. One end of the lever may engage with the end of the shaft opposite the pad. The apparatus includes an elastic member having one end attached to the tube and the other end affixed to the end of the shaft opposite the pad. As the lever rotates, the shaft may be pushed through the tube in one direction, or pulled in the tube in the other direction, depending on the direction, of rotation of the lever. The bracket may be configured to mount to a meat slicing device having a cutting element that projects through the bracket. Methods of spirally cutting meat products using the meat slicing device and the apparatus are also disclosed.

16 Claims, 9 Drawing Sheets

(51) Int. Cl.
*A22C 17/02* (2006.01)
*A22C 21/00* (2006.01)
*B26D 7/01* (2006.01)
*B26D 1/01* (2006.01)
*B26D 5/06* (2006.01)
*A47J 43/18* (2006.01)

(52) U.S. Cl.
CPC .......... *A22C 17/02* (2013.01); *A22C 21/0069* (2013.01); *A47J 43/18* (2013.01); *B26D 1/01* (2013.01); *B26D 5/06* (2013.01); *B26D 7/01* (2013.01); *B26D 2210/02* (2013.01)

(58) Field of Classification Search
CPC .... B26D 7/025; B26D 7/04; B26D 2007/011; B26D 2210/02; B26D 3/12; B26D 1/02; B26D 1/58; B26D 1/60; B26D 3/08; B26D 5/22; B26D 5/42; B26D 7/018; B26D 2210/04; A47J 43/18; A22C 17/0033; A22C 17/004; A22C 17/02; A22C 21/0069; A22C 17/12; A22C 21/0046; Y10T 82/10; Y10T 81/16; Y10T 83/9413; A23L 13/00; A23L 13/55
USPC ....... 426/518, 480, 414, 524, 231, 232, 315, 426/274, 275; 269/309; 83/680, 932, 83/340–342; 99/241 V, 419, 515, 99/537–539, 567, 584, 588–590, 594–599
See application file for complete search history.

(56) References Cited

U.S. PATENT DOCUMENTS

| | | | | |
|---|---|---|---|---|
| 1,742,059 | A * | 12/1929 | Coulson | B26D 7/02 269/54.1 |
| 1,817,658 | A * | 8/1931 | Van Hooydonk | B26D 7/02 83/719 |
| 1,959,022 | A * | 5/1934 | Donahoe | A22C 17/0006 426/420 |
| 2,121,348 | A * | 6/1938 | Held | B26D 7/01 83/719 |
| 2,599,328 | A | 6/1952 | Hoenselaar | |
| 2,673,156 | A * | 3/1954 | Minder | A22C 7/00 426/513 |
| 2,747,633 | A * | 5/1956 | Burlin | B26D 1/143 83/707 |
| 3,113,603 | A * | 12/1963 | Gardiner | A47J 17/16 99/593 |
| 3,153,436 | A | 10/1964 | Chesley | |
| RE26,684 | E | 10/1969 | Mason | |
| 3,623,186 | A * | 11/1971 | Panek | A22C 21/0069 452/138 |
| 3,951,054 | A * | 4/1976 | Frentzel | A22C 17/004 99/538 |
| 4,050,370 | A * | 9/1977 | Schmidt | A22C 17/0033 99/538 |
| 4,137,839 | A | 2/1979 | Couture et al. | |
| 4,287,820 | A * | 9/1981 | Urban | B26D 3/11 200/47 |
| 4,332,190 | A * | 6/1982 | Mart | B26D 3/11 83/478 |
| 4,374,490 | A * | 2/1983 | Boyer | B26D 3/11 99/538 |
| 4,412,483 | A * | 11/1983 | Hoegh | B26D 3/11 99/537 |
| 4,441,411 | A * | 4/1984 | Mullins, Jr. | B26D 3/11 99/537 |
| 4,463,643 | A * | 8/1984 | Bettcher | B26D 1/147 83/409.2 |
| 4,629,629 | A * | 12/1986 | David | A23N 4/02 426/482 |
| 5,050,492 | A | 9/1991 | Wotton et al. | |
| 5,251,543 | A * | 10/1993 | Brothers | A22C 17/0006 99/419 |
| 5,357,853 | A * | 10/1994 | Nelson | B26D 1/18 99/421 V |
| 5,408,737 | A | 4/1995 | Mailey et al. | |
| 5,989,116 | A * | 11/1999 | Johnson | B26D 1/0006 452/150 |
| 5,989,607 | A | 11/1999 | Dieso et al. | |
| 6,096,360 | A * | 8/2000 | Dieso | B26D 3/11 426/518 |
| 6,200,621 | B1 * | 3/2001 | Kojs | B26D 3/11 426/518 |
| 6,484,627 | B1 * | 11/2002 | Peter | B26B 29/063 99/419 |
| 6,966,254 | B2 * | 11/2005 | Ascari | A23N 7/026 99/489 |
| 7,070,824 | B1 * | 7/2006 | Gore | A22C 17/0033 426/302 |
| 7,214,403 | B1 | 5/2007 | Peters | |
| 7,428,860 | B2 | 9/2008 | Vagnby | |
| 7,685,916 | B2 * | 3/2010 | Mathues | B26D 7/04 83/257 |
| 8,070,567 | B2 | 12/2011 | Umino et al. | |
| 8,545,918 | B2 * | 10/2013 | Frankman | A22C 17/002 426/467 |
| 8,992,290 | B2 * | 3/2015 | Taniguchi | A22C 17/004 452/135 |
| 9,636,832 | B2 * | 5/2017 | Rexwinkle, Jr. | B26D 3/11 |
| 2003/0070525 | A1 * | 4/2003 | Barnhart | B26D 3/11 83/932 |
| 2006/0144204 | A1 | 7/2006 | Vagnby | |
| 2007/0251399 | A1 * | 11/2007 | Van Heerden | B26D 3/11 99/596 |
| 2009/0270021 | A1 | 10/2009 | Umino et al. | |
| 2011/0023682 | A1 * | 2/2011 | Brown | B26D 3/11 83/870 |
| 2012/0103149 | A1 | 5/2012 | Rexwinkle, Jr. et al. | |
| 2018/0050461 | A1 | 2/2018 | Rexwinkle, Jr. et al. | |

* cited by examiner

METHOD AND APPARATUS FOR SPIRAL HAM SLICING

This patent application is a national stage application of International Patent Application No. PCT/US2015/12619, filed Jan. 23, 2015, which claims priority to U.S. Provisional Patent Application No. 61/931,322, filed Jan. 24, 2014, the disclosures of each of which are herein incorporated in their entireties.

FIELD OF THE DISCLOSURE

The present invention relates to an apparatus and method for improved spiral cutting of ham and other food products.

BACKGROUND OF THE INVENTION

Spirally-sliced bone-in ham products are popular with consumers, largely because of the convenience of being able to easily remove the pre-sliced ham pieces from the product. A spirally-sliced bone-in ham is produced by slicing it in a manner to form a continuous spiral cut around a centrally-located bone, such as a femur bone. Thus, the meat remains substantially connected to the bone such that the spirally-sliced ham remains intact and can be handled and packaged without pieces falling off, folding over, and otherwise deforming. As a result, a spiral-sliced bone-in ham combines the appealing visual characteristics of an intact ham with convenience of slices that are easily detached from the bone and served. Furthermore, since the ham is sold with meat attached to bone, the consumer has reassurance that the meat is not adulterated with undesirable fillers or byproducts.

It has been recognized that many consumers are hesitant to purchase an entire ham because there is more meat than the household of the purchaser can conveniently consume. As a result, spirally sliced hams are commonly sold at retail in half portions. The full ham is cut transversely through the femur in order to cut the product into a butt half and a shank half. The half that is adjacent to the butt end includes part of the femur and the aitch bone, while the half at the shank end of the product includes the rest of the femur and the shank bone. Both halves are commercially appealing in that only the ends of the femur are visible and the product is not unsightly. Also, the meat remains attached to the bone continuously completely around it, so slices are not prone to falling off or becoming deformed during subsequent handling and packaging.

Spiral slicing of ham is known in the art. A number of different apparatus for spiral slicing of meats, such as hams or roasts, about the bone located in the cut of meat are known. These devices have a number of common features. First, they typically include a rotating chuck assembly. The chuck assembly is driven by some motorized means and is designed to hold the meat to be cut, thereby rotating the meat about the chuck assembly rotational axis. Second, the device includes a powered saw blade, disposed in a plane generally perpendicular to the rotational axis of the chuck assembly and including a means for driving the saw blade, for cutting the meat. To facilitate the mechanics of the cutting process, provisions are generally made for adjusting the position of the saw blade relative to the stated plane. Third, the device includes a means of gradually linearly indexing the saw blade assembly relative to the meat. The index axis is typically parallel to the chuck assembly rotational axis. Lastly, the saw blade assembly typically includes a means for rotating the saw blade about the index axis, thereby laterally positioning the saw blade and bringing the blade into cutting engagement with the meat. The rotation of the meat, when in contact with the saw blade, and the linear indexing of the blade relative to the meat, effect a generally continuous spiral cut of the meat about the bone. While the concept of the apparatus has been accepted, there persists a number of problems associated with existing devices, which will be described hereinafter.

U.S. Pat. Nos. 2,599,328 and 3,153,436 both disclose apparatus for spiral slicing of ham employing a reciprocating knife structure. In U.S. Pat. No. 2,599,328, the reciprocating knife is maintained in an essentially horizontal plane while the rotating ham is mounted on a carriage which is adapted to move in a generally upward direction. U.S. Pat. No. 3,153,436 discloses a slicer for boned (i.e., bone-in) or boneless meat products having a reciprocating knife blade which is pivotably mounted on an indexable carriage for engagement with the rotating meat so as to produce a spiral cut therein.

In U.S. Pat. No. 3,153,436, meat rotation, knife blade oscillation, and knife blade indexing are accomplished using a variety of shafts and gears coupled to a single motor. An upper axial adjustable support and a lower rotatably driven support are provided to hold the meat. The upper axial adjustable support includes a rotatable prong structure provided on the lower end of a rod. This structure holds the upper end of the meat for indirect or passive rotation (i.e., the upper support rotates in response to the rotatively driven meat positioned on the rotatively driven lower support). The lower rotatably driven support includes a power driven shaft equipped with a disc having an upwardly projecting center portion and three upwardly projecting circumferentially spaced prongs or tines. The power driven shaft is linked to the single motor by a transmission assembly. When it is desired to slice a boneless meat product, the upper axially adjustable support is outfitted with an accessory spit structure having a telescoping rod and a disc equipped with openings to receive the prongs of the upper support structure. In operation, the telescoping rod of the accessory spit structure is inserted into the boneless meat product so that it longitudinally traverses the boneless meat product, and thereby provides an axis of rotation, and more importantly a structural support running throughout its length, to make spiral slicing possible. The spitted and fully supported meat is then mounted on the slicer for spiral slicing as described in the case of a bone-in product.

U.S. Pat. No. 5,989,607 discloses a ham product that is formed by cutting a spirally-sliced half-ham longitudinally through the bone. The cut can be made by feeding the half-ham through a band saw blade by hand, by pushing a split cart through the blade, or by feeding the product through the blade on a split belt conveyor. Whatever method is used involves aligning the femur with the saw blade so that the femur is cut longitudinally and the meat remains attached to the bone around approximately half of its original circumference.

U.S. Pat. No. 7,214,403 discloses a product formed by cutting a ham into three or four pieces. The femur is cut only once, in a direction transverse to the femur, thus only the ends of the femur are visible. Each quarter or portion having a bone exposes the bone only along a substantially flat surface on its sides.

In a spirally sliced bone-in ham, the femur provides structural support for the slices. When a spiral sliced bone-in ham is processed according to the disclosure of U.S. Pat. No. 7,214,403, a boneless piece is produced that does not include any part of the femur. Without the structural support provided by attachment to the femur, slices of ham may fall off, fold over, and otherwise deform, requiring extra care in packaging and transporting the product, and potentially necessitating insertion of a skewer or other support mechanism. Despite such extra care, such a delicate product may nonetheless exhibit an irregular shape that appears "processed" and makes an unattractive presentation at the dinner table. Thus, the pieces of ham lacking the structural support of the femur may lose some consumer appeal.

Current methods for spiral cutting ham do not completely cut the entire ham. Further, methods for spiral cutting ham result in an unacceptable level of products which may not be sold as a "prime" products. Accordingly, there is a need in the food service industry for a method of spiral cutting ham that cuts more of the ham and fewer non-prime products.

SUMMARY OF THE INVENTION

An exemplary embodiment of the present invention includes an apparatus comprising a shaft having a proximal end and a distal end. The apparatus further comprises a pad disposed at the proximal end of the shaft, wherein the pad is configured to support at least a portion of a rotating meat product. The apparatus further comprises a hollow tubular member, wherein the shaft is slidably arranged inside the tubular member such that at least a portion of the shaft is enclosed by the tubular member. The apparatus further comprises a bracket, wherein the tubular member is securely mounted to at least a portion of the bracket. The apparatus further comprises a lever, wherein the lever comprises a pivot configured to rotate about an axis of rotation, a top arm projecting from the pivot and terminating at a top distal end, and a bottom arm projecting from the pivot in a different direction from the top arm and terminating at a bottom distal end, wherein the pivot is affixed to the bracket so that the lever may rotate at the pivot, wherein the top arm and bottom arm are both generally perpendicular to the axis of rotation. Finally, the apparatus further comprises an elastic member having a first end and a second end, wherein the first end of the elastic member is securely attached to a portion of the hollow tubular member and the second end of the elastic member is securely attached to the distal end of the shaft, wherein the elastic member comprises means for exerting a force on the distal end of the shaft in a direction from the distal end to the proximal end of the shaft. The invention also includes methods for spirally slicing meat products, and processes for producing spirally sliced meat products.

DETAILED DESCRIPTION OF THE EMBODIMENTS

In order that the invention herein described may be fully understood, the following detailed description is set forth. Various embodiments of the invention are described in detail and may be further illustrated by the provided examples. Additional viable variations of the embodiments can easily be envisioned.

Definitions

Unless defined otherwise, all technical and scientific terms used herein have the same meaning as those commonly understood by one of ordinary skill in the art to which this invention belongs.

As used in the description herein and throughout the claims that follow, the meaning of "a," "an," and "the" includes plural reference unless the context clearly dictates otherwise.

The present invention is drawn to apparatuses and methods for producing improved spirally cut meat products, such as spirally cut hams. The method includes securing a meat product between two opposing supports, wherein the opposing supports comprise an upper support and a lower support. The method rotates the meat product about an axis of rotation using a motor connected to one or both of the upper and lower support, wherein the axis of rotation passes through the upper and lower supports. The method inserts a cutting element into the rotating meat product in a direction substantially perpendicular to the axis of rotation, wherein the cutting element slices at least a portion of the meat product as it rotates. The method may progressively or gradually elevate the cutting element towards the upper support, in a direction parallel to the rotating meat product's axis of rotation, creating a continuous spiral cut around the meat product.

As part of the improvement over the prior art, the method touches the meat product with at least one pad, wherein the pad acts to stabilize a portion of the meat product as it rotates. The pad is be attached to a shaft that is part of a stabilizer apparatus to be described below. The pad may touch the rotating meat product at an uncut portion of the meat product (between the cutting element and the upper support). The pad may touch the rotating meat product at a cut portion (between the cutting element and the lower support). The pad may prevent the engaged portion of the meat product from slipping or falling away from the rest of the meat product as the meat product rotates. The method withdraws the cutting element from the meat product and stops the rotation of the meat product once a portion of the meat product has been spirally cut.

The apparatus includes at least one shaft having a pad disposed at one end, wherein the pad is designed to abut meat products. The shaft may be slidably arranged inside a hollow tube mounted to a bracket. A lever is mounted to the bracket, where the lever may have two arms projecting from a pivot point on the bracket such that the lever may rotate about the pivot point. The end of one lever arm may be engaged with the end of the shaft opposite the pad.

The apparatus also includes at least one elastic member, such as a spring, where one end of the spring is affixed to a point on the hollow tube attached to the bracket, while the other end of the spring is affixed to the end of the shaft opposite the pad. The bracket is mounted to a device for slicing meat products. In one embodiment, rotating the lever in a counter-clockwise direction causes the shaft to be pulled in a direction away from a meat product, while stretching the spring. As the spring is stretched, it creates a biasing force that tends to pull the shaft back towards the meat product.

In one embodiment, as the device for slicing meat products (which includes the cutting element) elevates away from the ground, the lever arm tends to rotate in a clockwise direction due to the force exerted on it by the tensioned spring. This in turn causes the shaft to be pulled towards a meat product that is being spirally sliced, causing the pad to press against the meat product as it rotates.

Figure 1:
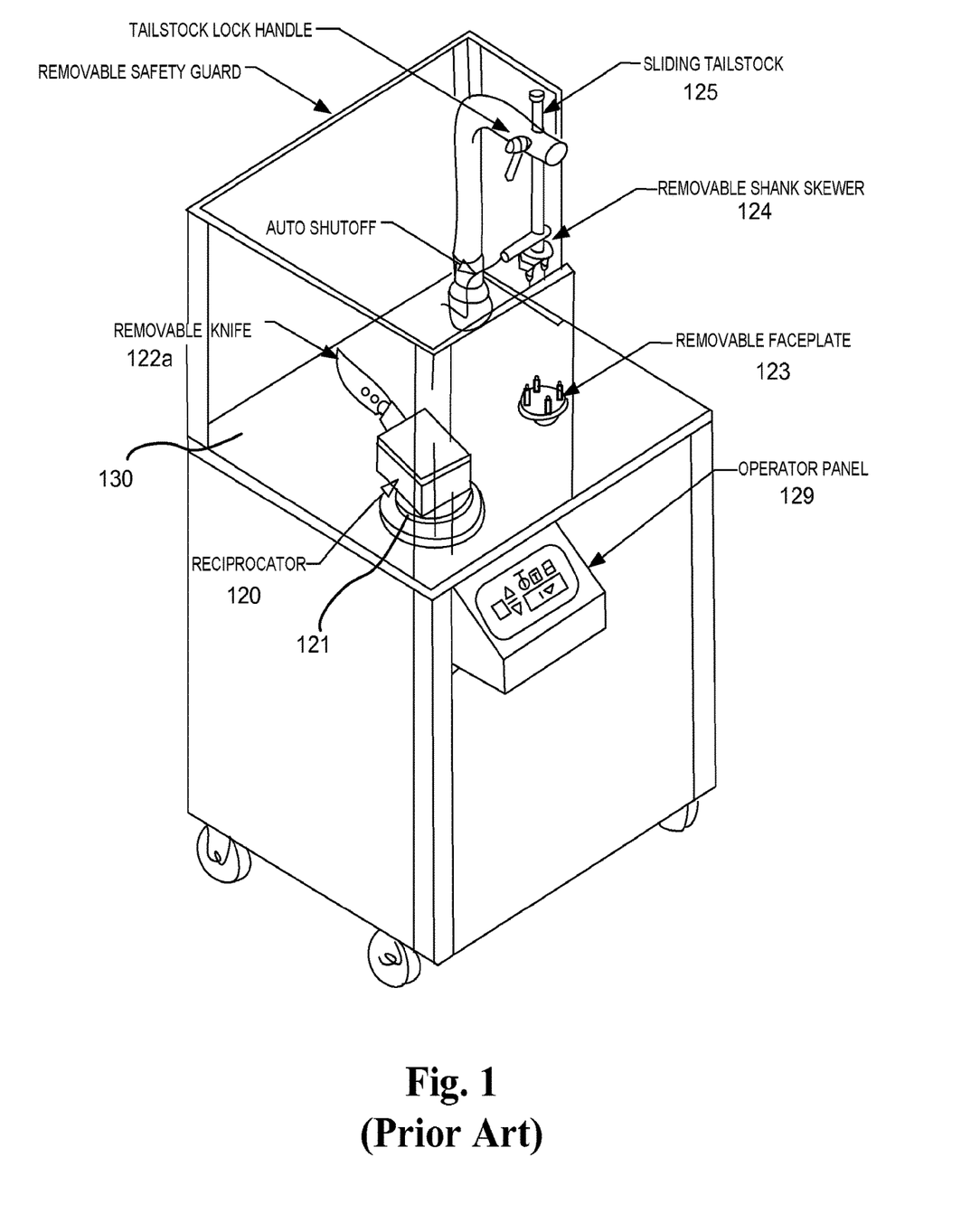
FIG. 1 depicts a schematic diagram of a prior art device for producing spirally cut ham.

Proceeding now to a description of the drawings, FIG. 1 depicts a known embodiment of a slicer for producing spiral-sliced hams. In the current, conventional process, a ham (not shown) is placed butt-end down on a removable faceplate 123 and held in place between the removable faceplate 123 and the removable shank skewer 124 using sliding stock 125 to adjust the fit. An operator turns on the slicer using operator panel 129. The faceplate 123 rotates, causing the ham to rotate with it (along with the shank skewer). The slicer also includes a reciprocator 120 that projects from the platform 130 via a lift 121. A removable blade 122a is attached to the reciprocator via attachment 122b (shown in FIGS. 2-3). The reciprocator 120 allows movement of the attached blade through a volume of space, and that volume intersects a portion of the volume occupied by a ham positioned between 123 and 124. When the operator activates the slicer, the ham begins to rotate about an axis of rotation that passes through the shank skewer 124 and faceplate 123. At the same time, the reciprocator is rotated so that the blade 122a engages the ham and begins slicing the ham as the ham rotates. As the ham rotates, an operator may activate the lift 121 to move the reciprocator 120 in a vertical direction perpendicular to and away from the platform 130. This gradual, vertical motion of the reciprocator causes the attached blade 122a to move up the ham as it rotates, leading to a spiral slicing cut. The operator may then stop the slicer once the removable blade 122a approaches the shank skewer 124 or reaches the top of the ham. During this process, as the blade moves up the ham, sliced meat may flop loosely, leading to missed cuts and defectively sliced ham products. The defectively sliced ham product are known as "number 2 products" as they can not be sold as prime products (e.g., higher priced ham product). The number 2 products are usually sold as a discount resulting in lost productivity and profits. The apparatus described herein produces an unexpectedly low amount of number 2 products.

Figure 2:
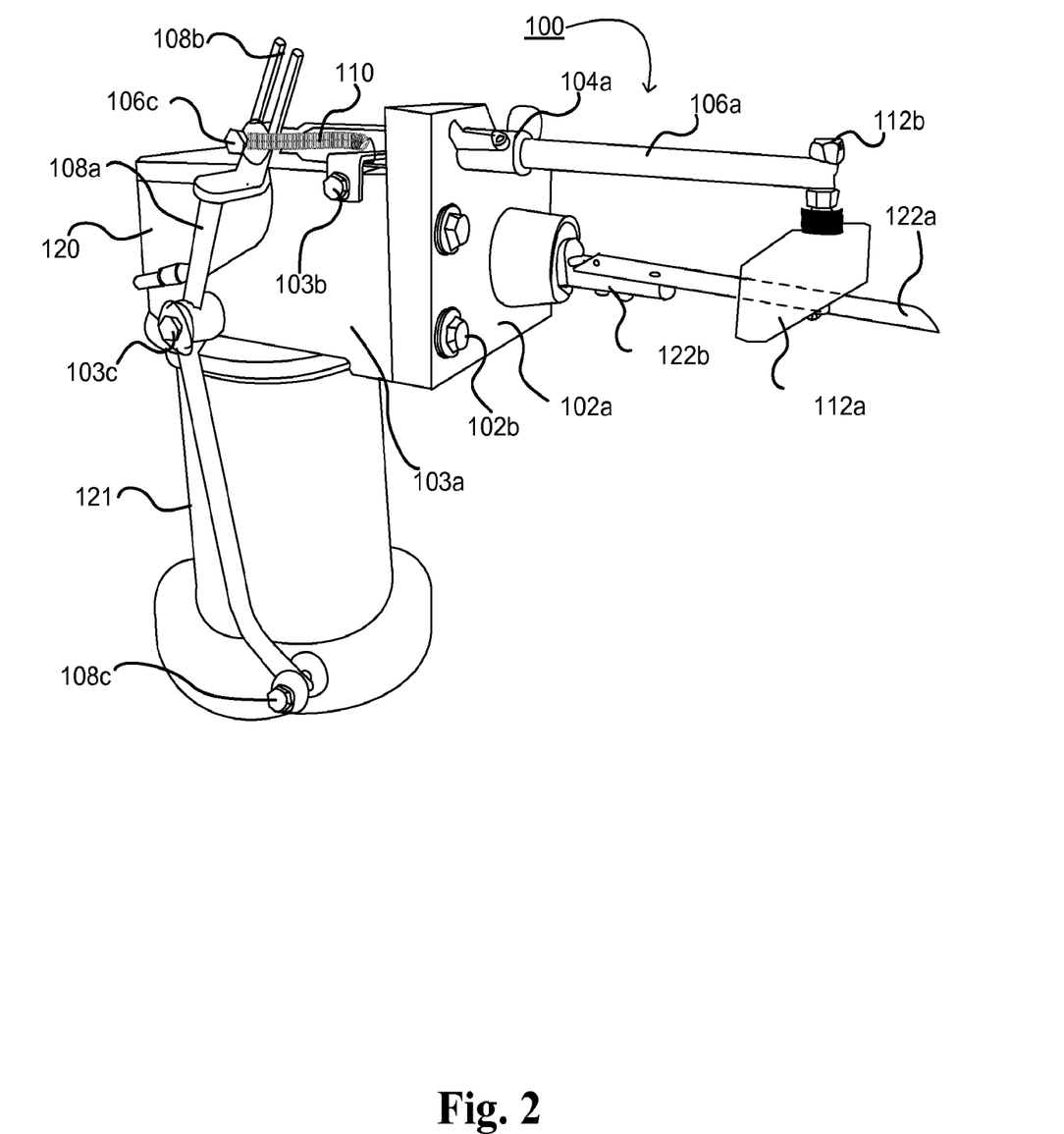
FIG. 2 is a schematic diagram of a ham stabilizer in an engaged position, according to an exemplary embodiment.
Figure 3:
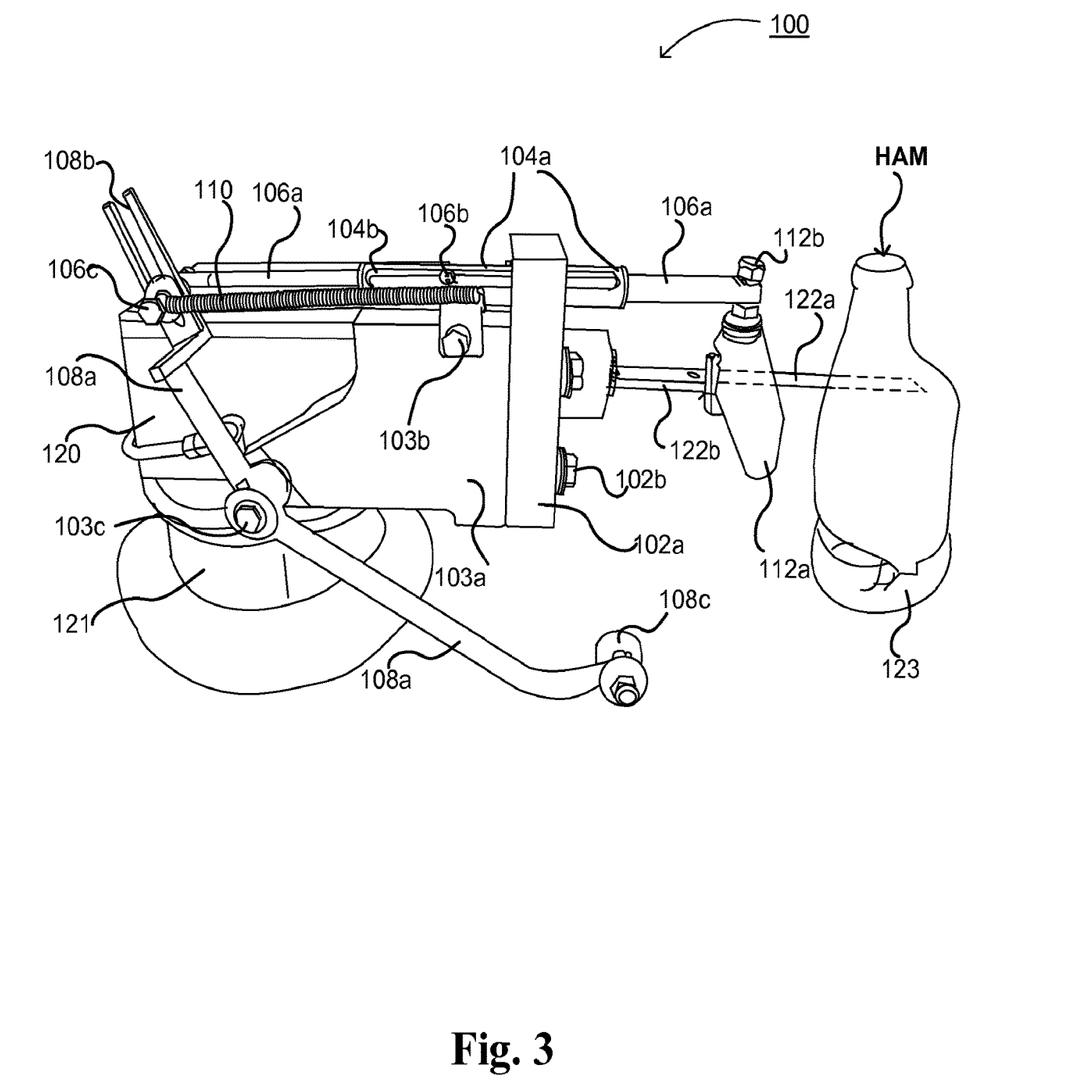
FIG. 3 is a schematic diagram of a ham stabilizer in an disengaged position, according to an exemplary embodiment.

FIGS. 2-3 depict an exemplary embodiment of the present invention, which includes a stabilizer mechanism 100 for improved spiral slicing operations, as it appears when mounted to reciprocator 120. Stabilizer 100 is configured to mount to a meat slicing machine for spirally cutting meat products, such as the reciprocator 120 shown in FIG. 1. Stabilizer 100 may be a ham stabilizer for supporting a rotating ham product as it is spirally sliced by a reciprocator/blade arrangement, as depicted in FIG. 1. As shown in FIG. 2, ham stabilizer 100 comprises one or more reciprocator attachment plates 102a, one or more support plates 103a, a tube 104a, a shaft 106a, a lever 108a, one or more elastic members 110, and one or more pads 112a. Stabilizer 100 may be securely bolted to reciprocator 120 through one or more spacers. As shown in FIGS. 2 and 3, ham stabilizer 100 is mounted to the front of reciprocator 120 so that blade attachment 122b (and thus blade 122a) projects out through an opening in attachment plate 102a of ham stabilizer 100; attachment plate 102a:

The depiction of blade 122a in FIGS. 1-3 is exemplary only. Blade 122a may have a sharpened edge. Blade 122a may have a serrated edge. Blade 122a may be double-edged. Blade 122a may be a knife, a saw, a circular saw, a bandsaw, a table saw, or other cutting implement. The length, width, and thickness of blade 122a may vary depending on the size of the ham to be cut, the location of the ham stabilizer 100 relative to the ham, the desired thickness of the slices, and other design considerations. Blade 122a may be attached to one or more motors (not shown) that may drive blade 122a in a rapid sawing pattern.

Lift 121 may be operated to elevate reciprocator 120, attachment 122b, and blade 122a at a certain speed. Faceplate 123 and removable shank skewer 124 may rotate at a fixed or adjustable rate. The rate of rotation may be adjustable by an operator, depending on the size of the ham to be cut, the desired thickness of the slices, the relative sharpness of blade 122a, and other design considerations.

Reciprocator 120 may be attached to one or more motors (not shown). An operator may use operator panel 129 to activate the one or more motors and selectively rotate reciprocator 120 about an axis of rotation that is parallel to the axis of rotation for removable faceplate 123. As the reciprocator rotates, blade 122a rotates as well. An operator may use operator panel 129 to rotate reciprocator 120 so that blade 122a comes into contact with a meat product secured between faceplate 123 and shank skewer 124. At this point, the operator may cease the rotation of reciprocator 120 so that blade 122a remains in contact with the meat product.

Attachment plate 102a and support plate 103a may be securely joined using one or more bolts 102b to form a bracket. In an alternate embodiment, attachment plate 102a and support plate 103a may be welded together to form a bracket. In another embodiment, attachment plate 102a and support plate 103a may be integrally joined as a single member. As shown in FIG. 2, blade attachment 122b and blade 122a projects through a circular opening in attachment plate 102a. In this embodiment, attachment plate 102a and support plate 103a are joined so that they are perpendicular to each other.

Shaft 106a may be slidably arranged within tube 104a. Tube 104a may include one or more slots 104b (shown in FIG. 3). Shaft 106a may include one or more projections 106b that may ride within the one or more slots 104b, thereby preventing the shaft 106a from rotating inside the tube 104a about tube 104a's longitudinal axis.

Blade 122a and attachment 122b may project through the opening in attachment plate 102a in a direction substantially parallel to shaft 106a and tube 104a, as shown in FIGS. 2 & 3. In other embodiments, blade 122a and attachment 122b may project through the opening in attachment plate 102a at an angle compared to tube 104a and shaft 106a.

Pad 112a is disposed at the proximal end of the shaft 106a. Pad 112a may be made from high density polyethylene (HDPE). Pad 112a may be made of polypropylene (PP). Pad 112a may be made of Teflon. Pad 112a may be made of a type of Silicone Rubber of various harnesses. Pad 112a may have a concave surface facing away from stabilizer 100 that conforms, at least in part, to the shape of a meat product placed between faceplate 123 and skewer 124. Pad 112a may have a flat surface facing away from apparatus 100. Shaft 106a may have one or more holes drilled perpendicular its longitudinal axis. One or more bolts 112b may be used to attach pad 112a to the proximal end of shaft 106a. Pad 112a may be free to rotate about an axis that is perpendicular to the longitudinal axis of shaft 106a and tube 104a. Tube 104a may be integrally affixed to attachment plate 102a. Tube 104a may be welded to support plate 103a. Tube 104a may be affixed to support plate 103a using one or more bolts 103b.

The distal end of shaft 106a may include projection 106c, which may serve several purposes. Projection 106c may be configured to ride within slot 108b of lever 108a (as shown in FIGS. 2-3). Projection 106c may also be affixed to the distal end of elastic member 110. The distal end of elastic member 110 may be bolted to projection 106c. The distal end of elastic member 110 may be clasped to projection 106c. The distal end of elastic member 110 may be hooked to projection 106c. The proximal end of elastic member 110 may be similarly attached to support plate 103a via connection 103b. The proximal end of elastic member 110 may be affixed to tube 104a. In other embodiments, the proximal end of elastic member 110 may be affixed to projection 106c, while the distal end of elastic member 110 may be affixed to some point on the reciprocator 120, or support plate 103a, that is closer to the back of reciprocator 120 (away from the side connected to attachment plate 102a).

Projection 106c may be integrally attached to the distal end of shaft 106a. In other embodiments, projection 106c may be a bolt that is inserted through a hole at the distal end of shaft 106a (similar to bolt 112b at the proximal end of shaft 106a). Projection 106c may be a bolt that is press-fit within a hole at the distal end of shaft 106a.

Lever 108a may be affixed to support plate 103a via pivot 103c. Pivot 103c may act as the fulcrum for lever 108a. Pivot 103c may be set within bearings in support plate 103a. As previously described, lever 108a may comprise two or more lever arms, wherein each lever arm projects from the fulcrum point of lever 108a. In FIGS. 2-6, lever 108a has two arms, a top arm having a slot 108b at its distal end, and a bottom arm having a projection 108c at its distal end. In other embodiments, lever 108a may have more than two arms.

Slot 108b may engage projection 106c of shaft 106a. When ham stabilizer 100 is affixed to reciprocator 120, projection 108c may be in contact with platform 130.

As shown in FIG. 3, pad 112a is designed to help stabilize a ham as it rotates on removable faceplate 123 and is being sliced by blade 122a. The operation of the stabilizer will be explained in more detail in reference to FIGS. 5 and 6. FIG. 2 shows the ham stabilizer 100 in the "engaged position." The "engaged position" refers to the point at which the reciprocator 120 has been elevated (via lift 121) to a point where projection 108c is no longer in contact with platform 130, and thus lever 108a is free to rotate about pivot 103c in either a clockwise or counter clockwise direction. At this point, as will be explained further, shaft 106a has slid in the proximal direction toward the ham, causing the pad 112a to contact the ham. FIG. 3 shows the ham stabilizer 100 in the "disengaged position." The "disengaged position" refers to the point at which the reciprocator 120 is ready to begin the slicing operation. The lever 108a has been pulled in the distal direction of the reciprocator (away from the ham), pulling the shaft 106a with it and stretching the elastic member 110. At this point, the pad 112a is not in contact with the ham. In other embodiments, where the proximal end of elastic member 110 is affixed to projection 106c, while the distal end of elastic member 110 may be affixed to some point on the reciprocator 120, or support plate 103a, that is closer to the back of reciprocator 120 (away from the side connected to attachment plate 102a), moving the ham stabilizer into a disengaged position may "compress" the elastic member 110. The operation of the ham stabilizer will be further described in reference to FIGS. 5 and 6.

In the engaged position, as the ham rotates and is spirally cut by blade 122a, pad 112a is pressed up against the unsliced portion of the ham above where blade 122a is currently spirally slicing the ham. In this way, pad 112a stabilizes the uncut portion of the ham as it rotates, preventing it from falling or slipping, or interfering with blade 122a. As the lift 121 causes reciprocator 120 to continue to rise, pad 112a and blade 122a rise with it. Thus, pad 112a remains a fixed vertical distance above blade 122a, measured in the direction that reciprocator 120 is moving as it is elevated. In an alternate embodiment, pad 112a may be pressed up against the sliced portion of the ham below where blade 122a is currently spirally slicing the ham. In other embodiments, multiple pads may be used to support the meat product at positions both above and below where the blade 122a is spirally slicing the ham.

Figure 4:
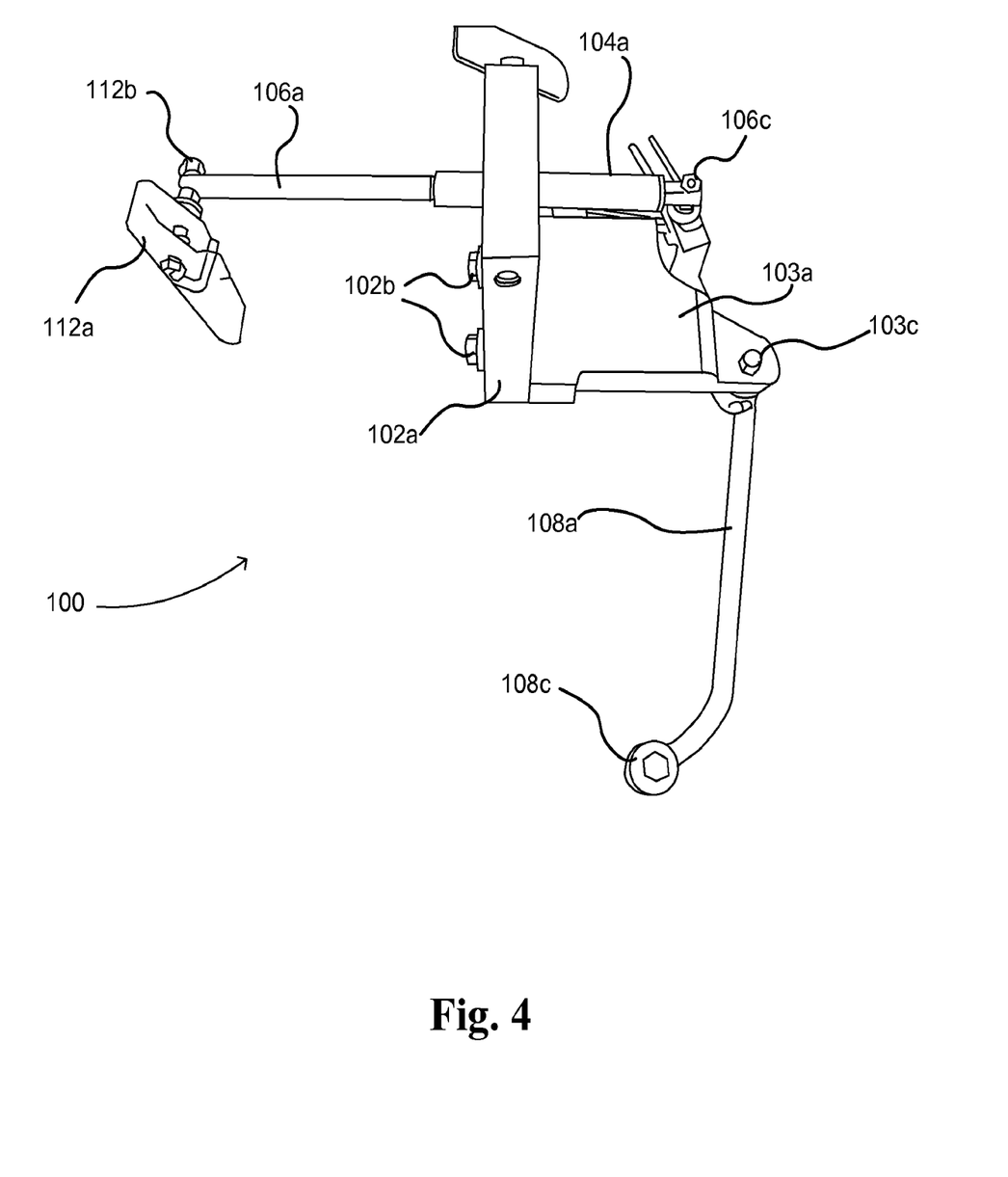
FIG. 4 is a schematic diagram of a ham stabilizer, according to an exemplary embodiment.

FIG. 4 shows a perspective view of an exemplary embodiment of ham stabilizer 100 as it would appear without the reciprocator attached. The ham stabilizer 100 in FIG. 4 is shown from a view opposite that shown in FIGS. 2 and 3.

Figure 5:
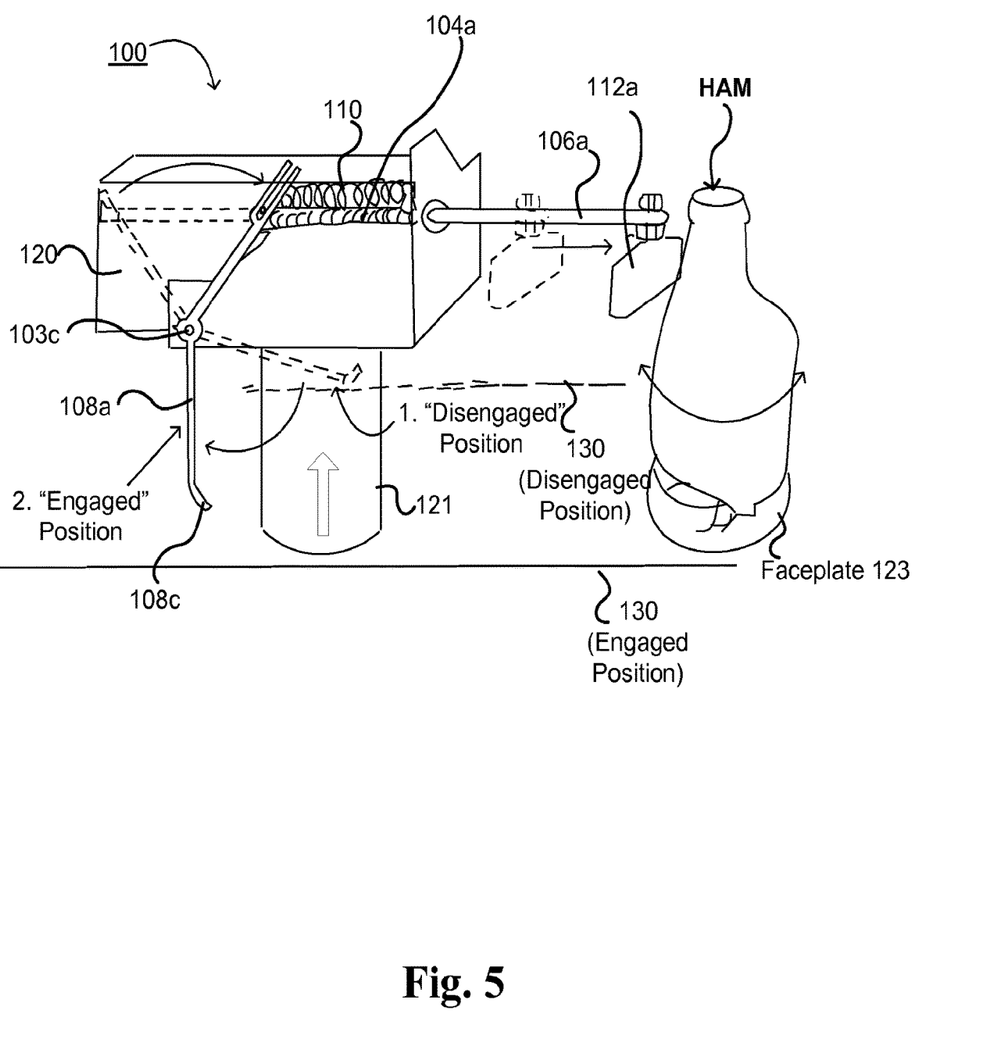
FIG. 5 is a schematic diagram of the operation of the ham stabilizer, according to an exemplary embodiment.

FIG. 5 shows the operation of the ham stabilizer 100, according to an exemplary embodiment. As shown in FIG. 5, ham stabilizer has been mounted to reciprocator 120. At the beginning of the ham cutting operation, the ham stabilizer is in the "disengaged position." As previously stated, in this position, the lift 121 has been lowered, bringing the reciprocator 120 close to the platform 130. In the "disengaged position," the lever 108a has rotated about pivot 103c, with projection 108c resting on the platform 130. In this embodiment, as the lever rotates about pivot 103c in a counter-clockwise direction, the movement of slot 108b pulls projection 106c in a distal direction (away from the ham). This motion causes shaft 106a to slide in a distal direction through tube 104a, pulling pad 112a in a distal direction so that it is not in contact with the ham that is on faceplate 123.

At the same time, elastic member 110 is stretched, since the distal end of elastic member 110 is connected to projection 106c (which has been moved in a distal direction), while the proximal end of elastic member 110 remains fixed to connection 103b. In this way, putting the ham stabilizer 100 in a "disengaged position" stores energy in the elastic member 110, causing elastic member 110 to exert a force on projection 106c in a proximal direction (towards the ham). However, the lever 108a is prevented from rotating in a clockwise direction because of the projection 108c being in contact with the platform 130.

Once the ham stabilizer is in the disengaged position, the operator may begin the spiral cutting process. In FIG. 5, the platform 130 is shown in two different positions for illustrative purposes only. In actual operation, the lift 121 causes reciprocator 120 to move in a vertical direction relative to the horizontal plane of platform 130.

Once the operator activates the spiral cutting process, the lift 121 causes the reciprocator 120 to gradually rise in a vertical direction perpendicular to platform 130. As this is occurring, the stored energy in elastic member 110 causes lever 108a to rotate in a clockwise direction about pivot 103c as projection 108c follows platform 130. This clockwise rotation of lever 108a causes shaft 106a to slide in a proximal direction through tube 104a, towards the ham.

As the reciprocator continues to rise, the ham stabilizer reaches the "engaged position," where the pad 112a is in contact with the rotating ham, and projection 108c is no longer in contact with platform 130. In the embodiment shown in FIG. 5, because the shaft 106*a* projects from a point on the attachment plate 102*a* that is higher than the point where the blade attachment 122*b* projects from the attachment plate (relative to platform 130), the pad 112*a* will engage the portion of the ham above the point where the removable blade 122*a* is slicing the ham. At the point where the stabilizer 100 has reached the "engaged position," the projection 108*c* is no longer contacting platform 130, thus allowing the lever 108*a* to freely rotate about pivot 103*c* in either a clockwise or counter-clockwise direction. Elastic member 110 may be positioned in such a way that tends to pull the shaft 106*a* in a proximal direction, thus ensuring that pad 112*a* will stay in contact with the ham as it rotates, while allowing shaft 106*a* to freely slide in a distal direction if the rotation of the ham pushes back against pad 112*a*.

In other embodiments, the length of shaft 106*a* may be adjustable. For example, shaft 106*a* may be designed as a telescoping tube-in-tube arrangement, thus allowing the operator to modify the length of the shaft to adjust for different size hams or for the positioning of the reciprocator. Similarly, the length of lever arms may be adjustable.

Figure 6:
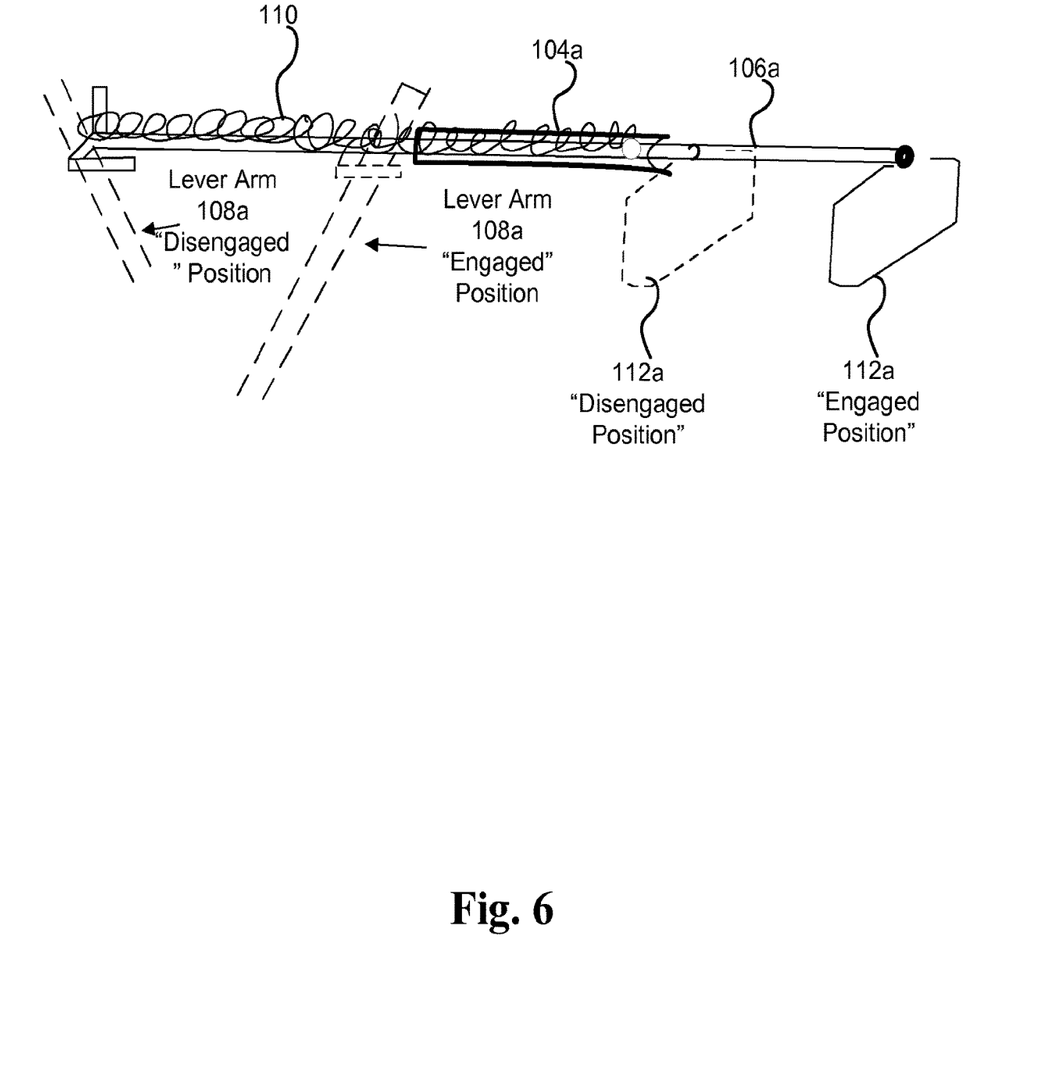
FIG. 6 is a schematic diagram of the operation of the ham stabilizer, according to an exemplary embodiment.

FIG. 6 is a close-up view of the operation of ham stabilizer 100, according to an exemplary embodiment. As shown in FIG. 6, when lever 108*a* is in the "disengaged position," pad 112*a* may be out of contact with the ham and may be located adjacent to the proximal end of tube 104*a*. As the ham stabilizer 100 moves into the engaged position, the force of elastic member 110 pulls the lever 108*a* in a proximal direction, forcing shaft 106*a* to slide in a proximal direction through tube 104*a*. This causes pad 112*a* to move towards the ham and engage the ham.

The exact positioning and dimensions of the various components of ham stabilizer 100 shown in FIGS. 2-6 are exemplary only, and are not meant to be limiting in any way. The size and relative positioning of each component may be altered, depending on a variety of factors, including, but not limited to, the needs of the operator, the size of the ham to be sliced, the location of the reciprocator relative to the faceplate 123, the length of blade element 122*a*, the size of the reciprocator, and other considerations.

Shaft 106*a*, tube 104*a*, attachment plate 102*a*, support plate 103*a*, and lever 108*a* may be made out of metal, such as aluminum, steel alloys, or other machinable materials well known in the art. Elastic member 110 may be made of metal, or an elastic material.

It is further noted that the apparatuses disclosed herein are not intended to be limited to spirally cutting hams. The ham stabilizer may be configured to operate in conjunction with devices for spirally cutting other food products.

Figure 7:
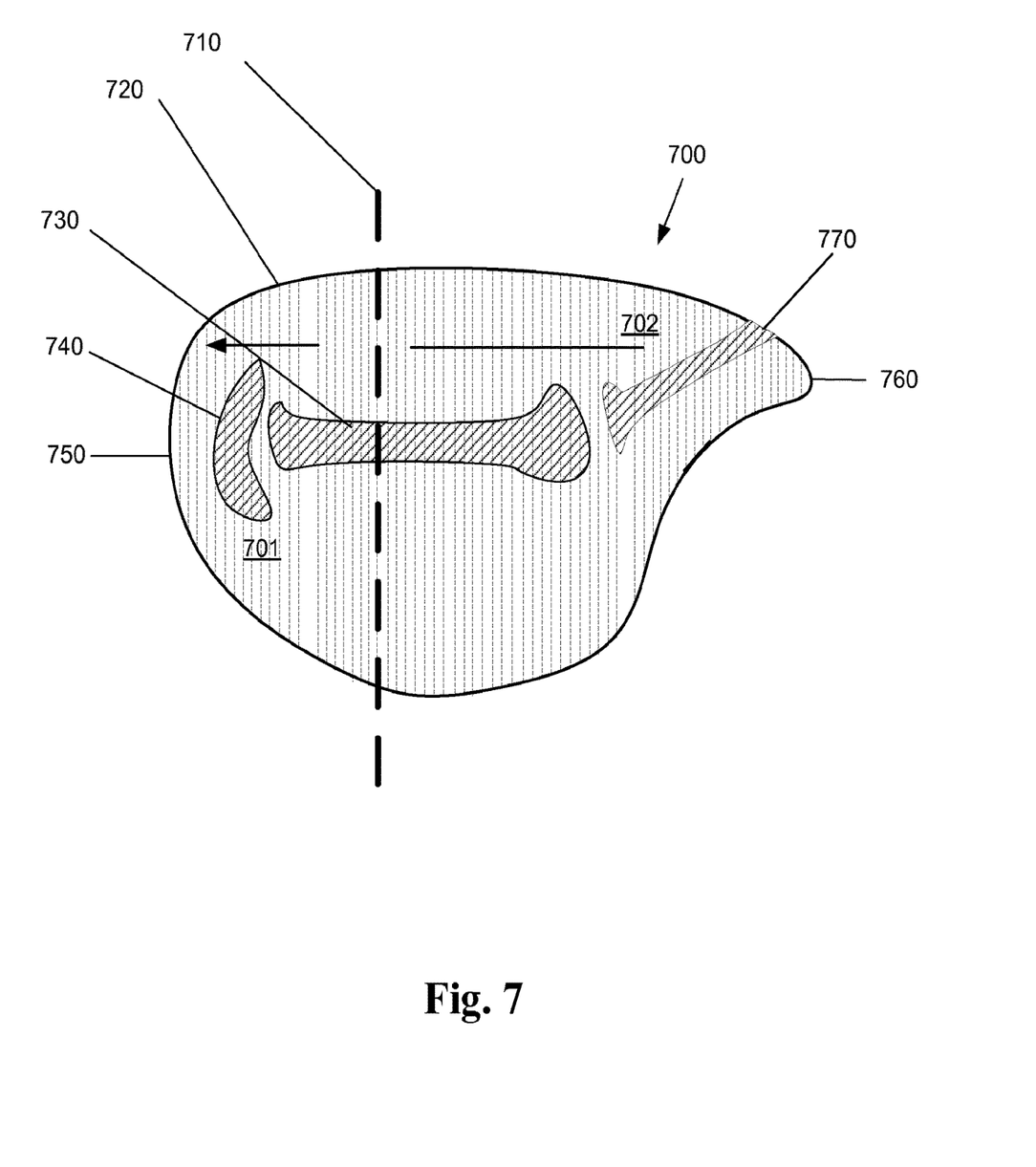
FIG. 7 is a schematic of a ham showing the relative position of the femur, shank, and aitch bone.

Referring to FIG. 7, a short-shank ham is shown according to an exemplary embodiment of the present invention. A person of ordinary skill in the art recognizes that the short-shank ham 700 is not drawn to scale and may have any configuration of the bones contained therein, as known to one of ordinary skill in the art. Short-shank ham 700 typically comprises three bones: a shank bone 770, a femur bone 730, and an aitch bone 740. The aitch bone 740 is positioned substantially at the butt end 750 of the short-shank ham 700. The shank bone 770 extends substantially from a shank tip 760 of the short-shank ham 700 to the femur bone 730, which is positioned at a different angle from the shank bone 770. At the butt end 750 of the short-shank ham 700, the femur bone 730 is proximate to the aitch bone 740. In an exemplary embodiment of the present invention, the short-shank ham may be spirally-sliced 720 substantially the length of the short-shank ham 700 and substantially centered about the femur bone 730. A short-shank ham 700 may be separated along a transverse plane 710, resulting in a butt-end piece 701 and a shank-end piece 702.

A shank bone out (SBO) ham typically comprises two bones: a femur bone, and an aitch bone. The aitch bone is positioned substantially at the butt end of the SBO ham. At the butt end of the SBO ham, the femur bone is proximate to the aitch bone. In an exemplary embodiment of the present invention, the SBO ham may be spirally-sliced substantially the length of the SBO ham and substantially centered about the femur bone. A SBO ham may be separated along a transverse plane, resulting in a butt-end piece and a shank-end piece.

Figure 8:
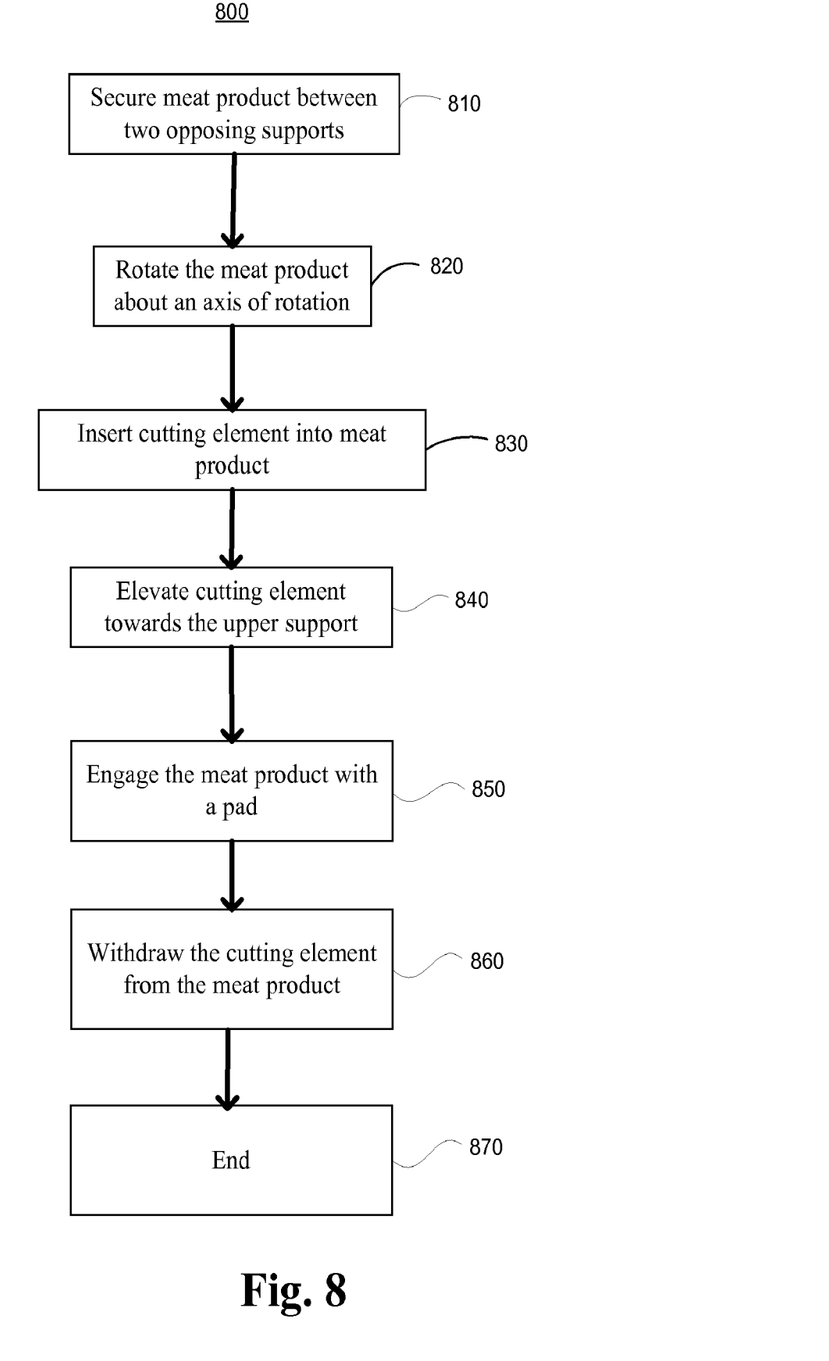
FIG. 8 is a block diagram of a method for spirally slicing meat products, according to an exemplary embodiment.

FIG. 8 is a block diagram illustrating a method for producing spirally-cut hams. This exemplary method is provided by way of example. The method 800 shown in FIG. 8 can be executed or otherwise performed by one or more combinations of various systems. The method 800 as described below may be carried out by the ham stabilizer 100 and reciprocator 120, as shown in FIGS. 2-6, by way of example, and various elements of the aforementioned apparatuses are referenced in explaining the method of FIG. 8. Each block shown in FIG. 8 represents one or more processes, methods, or subroutines in the exemplary method 800. Referring to FIG. 8, the exemplary method 800 may begin at block 810.

At block 810, method 800 secures a meat product between two opposing supports. The two opposing supports may comprise an upper support and a lower support. The upper support may be a removable shank skewer, such as removable shank skewer 124 shown in FIG. 1. The lower support may be a removable faceplate, such as removable faceplate 123 shown in FIG. 1. The meat product may be a ham. Method 800 may proceed to block 820.

At block 820, method 800 rotates the meat product about an axis of rotation. The axis of rotation may pass through the upper support and lower support. One or more motors may drive the rotation of the lower support or the upper support. The lower and upper support may rotate in a clockwise or counter clockwise direction, causing the meat product to rotate in a clockwise or counterclockwise direction. Method 800 may proceed to block 830.

At block 830, method 800 inserts a portion of a cutting element into the rotating meat product. The cutting element may have a sharpened edge. The cutting element may be a blade element 122*a* (shown in FIGS. 2 and 3), having a sharpened edge. Blade element 122*a* may be attached to reciprocator 120. Ham stabilizer 100 may be mounted to reciprocator 120 (as shown in FIGS. 2 and 3), and blade element 122*a* may project through an opening in ham stabilizer 100. Blade element 122*a* may be disposed in a plane generally perpendicular to the rotational axis of the meat product. The sharpened edge of the cutting element may be inserted into a portion of the meat product at a first distance from the lower support, where the first distance is measured along the axis of rotation. In other embodiments, the cutting element may be inserted into a portion of the meat product at a first distance from the upper support.

Reciprocator 120 may be configured to be selectively rotatable about an axis of rotation that is parallel to the axis of rotation of the meat product. In an exemplary embodiment, reciprocator 120 may rotate a quarter turn, causing at least a portion of the sharpened edge of blade element 122*a* to be inserted into the rotating meat product in a direction generally perpendicular to the meat product's axis of rotation. As the ham rotates, blade element 122*a* slices at least a portion of the ham. Method 800 may proceed to block 840.

At block 840, method 800 may gradually elevate the cutting element towards the upper support. In other embodiments, method 800 may gradually lower the cutting element towards the lower support. Lift 121 may elevate reciprocator 120 at a speed set by an operator. This causes blade element 122*a* to elevate at the same speed. The direction of elevation may be parallel to the meat product's axis of rotation. The combination of the rotation of the meat product and the elevation of the cutting element 122*a* as it engages the meat product may produce a continuous spiral slice in the meat product. Method 800 may proceed to block 850.

At block 850, method 800 touches the meat product with a pad in order to stabilize the meat product as it rotates. The pad, such as pad 112*a* shown in FIGS. 2-6, is connected to stabilizer 100 via shaft 106*a*. The pad 112*a* may move into contact with the meat product when the cutting element 122*a* has reached a second distance of elevation, measured along the axis of rotation. The second distance may be greater than the first distance from step 830. The pad may engage the unsliced portion of the rotating meat product at a region of the meat product that is above the portion where the blade element 122*a* is slicing the meat product. The pad may engage the sliced portion of the rotating meat product at a region of the meat product that is below the portion where the blade element 122*a* is slicing the meat product. The ham stabilizer 100 may be mounted to reciprocator 120 (as shown in FIGS. 2 and 3), and thus the pad 112*a* may remain at a fixed vertical distance above the blade element 122*a*. The pad 112*a* may press against the rotating meat product as a result of a biasing force produced by elastic member 110, which tends to produce a force on shaft 106*a* that pushes shaft 106*a* towards the meat product. Method 800 may proceed to block 860.

At block 860, method 800 withdraws the cutting element from the meat product. Cutting element may be withdrawn when it reaches a third distance from the lower support, where the third distance is measured along the axis of rotation. The third distance may be greater than the second distance from step 850. The cutting element may be withdrawn once it reaches the top of the meat product, or the end of the meat product. The cutting element may be withdrawn once the majority of the meat product has been spirally cut. The cutting element may be withdrawn by rotating reciprocator 120 so that cutting element 122*a* moves out of contact with the meat product. In embodiments where the cutting element is initially inserted into the meat product closer to the upper support than the lower support and then gradually lowered, the cutting element may be withdrawn once it reaches the bottom of the meat product, or once it reaches a third distance from the upper support. Method 800 may end at block 870.

The meat product stabilizer apparatus described in conjunction with FIGS. 2-6, and the method 800 described in connection with FIG. 8, may be used as part of a process for producing improved spirally sliced meat products. Spirally sliced meat products may be produced using the following process 900 depicted by the block diagram in FIG. 9, beginning with step 910.

Figure 9:
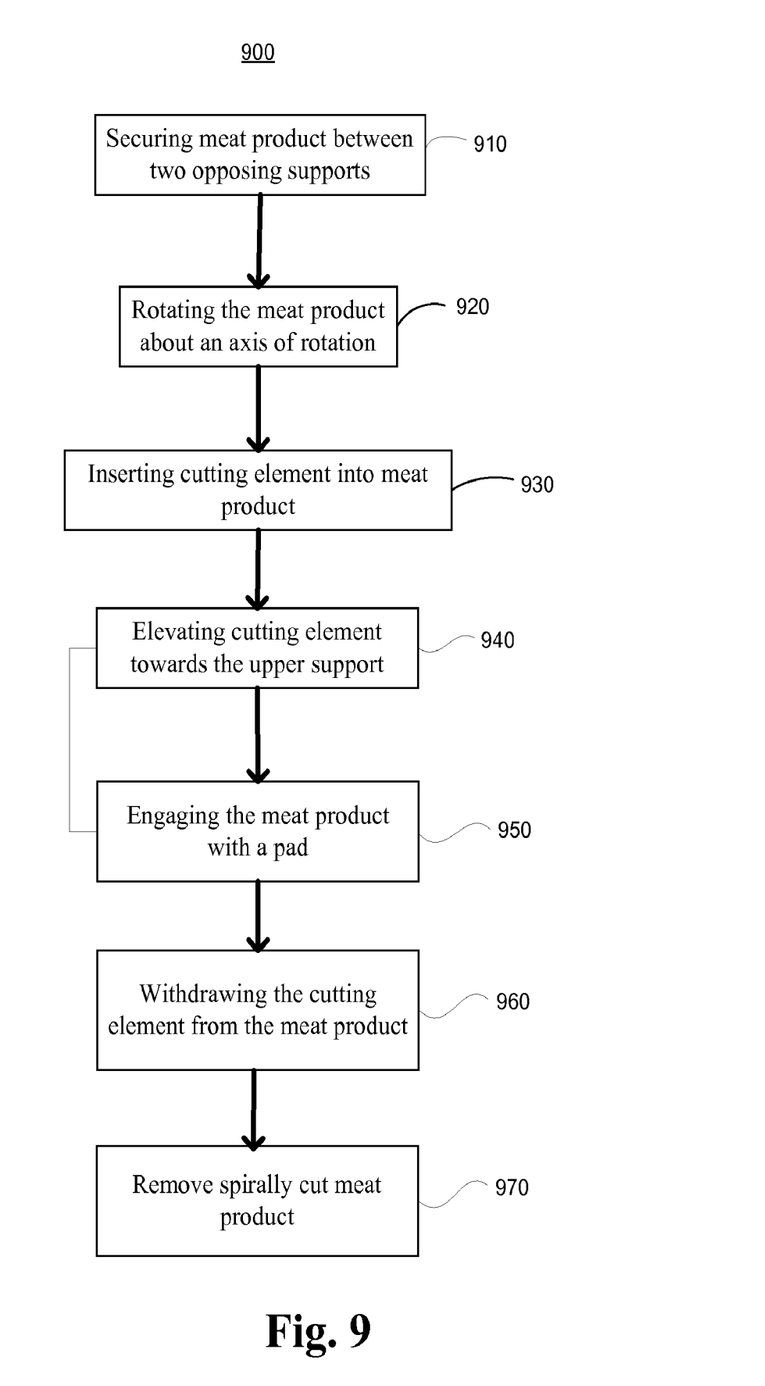
FIG. 9 is a block diagram of a process for producing spirally sliced meat products, according to an exemplary embodiment.

At step 910, process 900 begins with securing a meat product between two opposing supports, wherein the opposing supports comprise an upper support and a lower support. The meat product may be a whole ham, a bone-in ham, half ham, or a quarter ham. All or substantially all of the shank bone may have already been removed from the ham. The meat product may be turkey, beef, or chicken. Process 900 may proceed to step 920.

At step 920, process 900 continues by rotating the meat product about an axis of rotation, wherein the axis of rotation passes through the upper support and the lower support. One or more motors may drive the rotation of the lower support or the upper support. The lower and upper support may rotate in a clockwise or counter clockwise direction, causing the meat product to rotate in a clockwise or counterclockwise direction. Process 900 may proceed to step 930.

At step 930, process 900 continues by inserting at least a portion of a cutting element into the rotating meat product. The cutting element may include a sharpened edge, and the sharpened edge may be inserted into the meat product in a direction perpendicular to the meat product's axis of rotation. The cutting element may slice at least a portion of the meat product as it rotates. The cutting element may be disposed in a plane generally perpendicular to the rotational axis of the meat product. The sharpened edge of the cutting element may be inserted into a portion of the meat product at a first distance from the lower support, where the first distance is measured along the axis of rotation. Process 900 may proceed to step 940.

At step 940, process 900 may continue by elevating the cutting element towards the upper support and in a direction parallel to the axis of rotation. The combination of the rotation of the meat product and the gradual elevation of the cutting element as it engages the meat product may produce a continuous spiral slice in the meat product. The speed of the elevation of the cutting element may be coordinated with the rate of rotation of the meat product to produce a certain number of slices per inch in the meat product. Process 900 may proceed to step 950.

At step 950, process 900 continues by engaging at least a portion of the meat product with a pad, wherein the pad is configured to support at least a portion of the rotating meat product. The pad may engage a portion of the meat product when the cutting element has reached a second distance from the lower support, measured along the axis of rotation. The second distance may be greater than the first distance from step 930. The pad may engage the unsliced portion of the rotating meat product at a region of the meat product that is above the portion where the cutting element is slicing the meat product. The pad may engage the sliced portion of the rotating meat product at a region of the meat product that is below the portion where the cutting element is slicing the meat product. The pad may prevent unsliced portions of the rotating meat product from separating from sliced portions of the rotating meat product. The pad may prevent sliced portions of the rotating meat product from slipping away from or falling away from the rest of the rotating meat product. The pad may be elevate at the same rate as the cutting element, thus maintaining a constant vertical distance from the cutting plane of the cutting element. Process 900 may proceed to step 960.

At step 960, process 900 continues by withdrawing the cutting element from the meat product. Cutting element may be withdrawn when it reaches a third distance from the lower support, where the third distance is measured along the axis of rotation. The third distance may be greater than the second distance from step 950. The cutting element may be withdrawn once it reaches the top of the meat product, or the end of the meat product. The cutting element may be withdrawn once the majority of the meat product has been spirally cut. Process 900 may proceed to step 970.

At step 970, process 900 may end by removing a spirally cut meat product from between the supports.

While the exemplary apparatus depicted in FIGS. 2-6 shows a single shaft 106a and pad 112a connected to the bracket comprised of attachment plate 102a and support plate 103a, other embodiments may include multiple shaft/pad attachments. For example, a second shaft may be slidably arranged in a second tube attached to the bracket so that the second shaft projects from the second tube in a direction parallel to the first shaft. The second shaft may project from the second tube at a position on the bracket that is below the position where the blade element projects through the bracket (measured from the platform 130). The second shaft may be configured to attach to a second elastic element, lever arrangement—similar to the elastic element, lever arrangement shown in FIGS. 2-6. The second elastic element may have a higher (or lower) spring constant than elastic element 110. The second pad may engage with a rotating meat product at a region of the meat product that is below the region where the blade element engages the meat product. The second pad may engage with the portion of the rotating meat product that has already been spirally cut by the blade element. In other embodiments, the stabilizer 100 may have multiple shaft/pad arrangements configured so that the various pads engage the rotating meat product at different points and times during the spiral cutting process.

The apparatus and methods described herein unexpectedly resulted in cutting more of the ham. Also, the apparatus and methods described herein unexpectedly resulted in the production of fewer number 2 products as compared to prior art methods.

Although certain manufacturers, model names and numbers are given for machinery used in the invention, other machinery may be substituted, as would be appreciated by those skilled in the art.

Values for humidity, meat product temperature, room temperature, conveyer speed, and air flow can be varied based on the particular volumes desired, space requirements and other needs. After reading this specification, one skilled in the art will understand that the selection of working or optimum numbers for these variables may be made once the plant and overall process parameters of a particular processing installation are known. For example, the bulk meat temperature may be about 20-30° F. The bulk meat temperature may be about 25, 26, 27, 28, 29, or 30° F.). The room temperature may be about 40-50° F. The room temperature may be about 45-50° F.

Additionally, although preferred systems are disclosed for controlling the temperature and the humidity of the air conveyed to and removed from the housing for the microwave oven and conveyor, these may be varied. These may be varied by substituting, for example, chemical for mechanical systems or direct for recycle heating of the air, depending on normal plant considerations of energy cost, plant lay-out and the like, and generally the temperature and humidity values used in the process tolerate some ongoing variability due to, for instance, changes in ambient plant temperatures and humidity and other related factors.

The examples contained herein are offered by way of illustration and not by any way of limitation.

Although the invention has been described in some detail by way of illustration and example for purposes of clarity of understanding, it should be understood that certain changes and modifications may be practiced within the scope of the appended claims. Modifications of the above-described modes for carrying out the invention that would be understood in view of the foregoing disclosure or made apparent with routine practice or implementation of the invention to persons of skill in food chemistry, food processing, mechanical engineering, and/or related fields are intended to be within the scope of the following claims.

All publications (e.g., Non-Patent Literature), patents, patent application publications, and patent applications mentioned in this specification are indicative of the level of skill of those skilled in the art to which this invention pertains. All such publications (e.g., Non-Patent Literature), patents, patent application publications, and patent applications are herein incorporated by reference to the same extent as if each individual publication, patent, patent application publication, or patent application was specifically and individually indicated to be incorporated by reference.

While the foregoing invention has been described in connection with this preferred embodiment, it is not to be limited thereby but is to be limited solely by the scope of the claims which follow.

We claim:

1. A method for slicing a meat product, comprising:
   securing the meat product between two opposing supports, wherein the opposing supports comprise a first support and a second support;
   rotating the meat product about an axis of rotation, wherein the axis of rotation passes through the first support and the second support;
   inserting at least a portion of a cutting element into the rotating meat product, wherein the cutting element has a sharpened edge, wherein at least a portion of the sharpened edge is inserted into the meat product in a direction substantially perpendicular to the axis of rotation, wherein the cutting element slices at least a portion of the meat product as the meat product rotates;
   moving the cutting element towards the first support and in a direction parallel to the axis of rotation;
   engaging at least a portion of the meat product with a pad, wherein the pad supports at least a portion of the rotating meat product, and wherein the pad is affixed to a shaft slidably arranged within a tube of a support plate or attachment plate, an elastic member attached at one end to an outer surface of the shaft and attached at an opposing end to an outer surface of the support plate, the elastic member biasing the shaft and the pad towards the meat product to slide the shaft within the tube as the cutting element is moved towards the first support; wherein the support plate, attachment plate, and cutting element are affixed to an apparatus for slicing meats; and
   withdrawing the cutting element from the meat product.

2. The method of claim 1, wherein the cutting element is inserted into the rotating meat product at a first distance from the second support, said first distance measured along the axis of rotation.

3. The method of claim 2, wherein the pad engages the meat product when the cutting element reaches a second distance from the second support, said second distance measured along the axis of rotation, said second distance being greater than said first distance.

4. The method of claim 3, wherein the cutting element is withdrawn when the cutting element reaches a third distance from the second support, said third distance measured along the axis of rotation, said third distance being greater than said second distance.

5. The method of claim 1, wherein the cutting element is selected from the group consisting of a knife, a saw, a bandsaw, a table saw, and a blade.

6. The method of claim 1, wherein the meat product is a ham, turkey, chicken, or beef product.

7. The method of claim 6, wherein the meat product is ham.

8. The method of claim 7, wherein said method further comprises removing a shank bone from the ham prior to securing the meat product between the two opposing supports.

9. The method of claim 1, wherein rotating the meat product is driven by rotating the second support about the axis of rotation.

10. The method of claim 9, wherein inserting the cutting element into the rotating meat product and moving the cutting element produces a continuous spiral slice in the meat product.

11. The method of claim 3, wherein the second distance is halfway between the first support and the second support.

12. The method of claim 1, wherein the pad engages a portion of the meat product that has not been cut by the cutting element.

13. The method of claim 1, wherein moving the cutting element comprises elevating the cutting element in a substantially vertical direction.

14. The method of claim 1, wherein moving the cutting element comprises lowering the cutting element in a substantially vertical direction.

15. The method of claim 1, wherein the shaft includes a projection and the tube includes a slot, the projection of the shaft riding within the slot of the tube during sliding of the shaft within the tube to prevent rotation of the shaft within the tube along a longitudinal axis of the shaft.

16. A method for slicing a meat product, comprising:
(a) securing the meat product between two opposing supports, wherein the opposing supports comprise a lower support and an upper support;
(b) rotating the meat product about an axis of rotation, wherein the axis of rotation passes through the lower support and the upper support;
(c) inserting at least a portion of a cutting element into the rotating meat product, said cutting element having a sharpened edge, wherein at least a portion of the sharpened edge is inserted into the meat product in a direction substantially perpendicular to the axis of rotation, wherein the cutting element slices at least a portion of the meat product as the meat product rotates;
(d) elevating the cutting element towards the upper support and in a direction parallel to the axis of rotation;
(e) engaging at least a portion of the meat product with a pad, wherein the pad supports at least a portion of the rotating meat product, and wherein the pad is affixed to a shaft slidably arranged within a tube of a support plate or attachment plate, an elastic member attached at one end to an outer surface of the shaft and attached at an opposing end to an outer surface of the support plate, the elastic member biasing the shaft and the pad towards the meat product to slide the shaft within the tube as the cutting element is elevated towards the upper support; wherein the support plate, attachment plate, and cutting element are affixed to an apparatus for slicing meats; and
(f) withdrawing the cutting element from the meat product.

* * * * *